US007925532B2

(12) United States Patent
Benkoski et al.

(10) Patent No.: US 7,925,532 B2
(45) Date of Patent: *Apr. 12, 2011

(54) CAD TOOL INCENTIVES

(75) Inventors: Jacques Benkoski, Menlo Park, CA (US); Dineshchandra R. Bettadapur, Santa Clara, CA (US); Aidan Cullen, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 209 days.
This patent is subject to a terminal disclaimer.

(21) Appl. No.: 12/181,237

(22) Filed: Jul. 28, 2008

(65) Prior Publication Data

US 2008/0288897 A1 Nov. 20, 2008

Related U.S. Application Data

(63) Continuation of application No. 09/780,882, filed on Feb. 9, 2001, now Pat. No. 7,430,543.

(51) Int. Cl.
*G06Q 30/00* (2006.01)
*G06F 17/50* (2006.01)
(52) U.S. Cl. ............... 705/14.15; 705/14.25; 705/14.38; 716/132
(58) Field of Classification Search ............... 705/14.15, 705/14.25, 14.38, 26, 59; 716/123
See application file for complete search history.

(56) References Cited

U.S. PATENT DOCUMENTS 6,049,789 A 4/2000 Frison et al.
6,055,519 A 4/2000 Kennedy et al.

(Continued)

FOREIGN PATENT DOCUMENTS

WO WO 98/21676 5/1998

OTHER PUBLICATIONS

Consumer Action, "1999 Long Distance Telephone Rate Survey", released Jun. 1, 1999; downloaded Nov. 19, 2010 from http://www.consumer-action.org/news/articles/1999_long_distance_telephone_rate_survey/.*

(Continued)

*Primary Examiner* — Donald L Champagne
(74) *Attorney, Agent, or Firm* — Bever, Hoffman & Harms, LLP; Jeanette S. Harms

(57) ABSTRACT

This invention pertains to the field of creating incentives for the completion of the design of integrated electronic circuits (chips). Modern chip design use sophisticated computer aided design software (CAD tools). Typically, CAD tools are sold or rented with pricing schemes that restrict the number of copies and usage of the software and are accompanied by a time-based maintenance charge. These pricing schemes do not encourage cooperation and business efficiency. In one embodiment of the invention, a CAD tool vendor receives two payments, one for access to the technology, providing unlimited usage and copies of the software, and a second payment when the technology produces a useful result. This connects vendor payment to the success of the customer. The vendor finds it advantageous to create tools that are easy to learn, easy to use, and with all the necessary functionality. The CAD tool vendor is more likely to quickly resolve any problem encountered by a customer in order to hasten the completion of the customer's program and hence receive the payment. By sharing the financial risk, the vendor becomes a trusted partner in the customer's program and increases customer productivity. The software vendor becomes a key part of the supply chain and shares in the rewards of opening the customer's productivity bottleneck.

16 Claims, 2 Drawing Sheets

U.S. PATENT DOCUMENTS

| | | | |
|---|---|---|---|
| 6,134,534 | A | 10/2000 | Walker et al. |
| 6,141,653 | A | 10/2000 | Conklin et al. |
| 6,185,683 | B1 | 2/2001 | Ginter et al. |
| 6,266,647 | B1 * | 7/2001 | Fernandez ................ 705/14.14 |
| 6,269,467 | B1 | 7/2001 | Chang et al. |
| 6,418,421 | B1 | 7/2002 | Hurtado et al. |
| 6,594,799 | B1 | 7/2003 | Robertson et al. |
| 6,650,761 | B1 | 11/2003 | Rodriguez et al. |
| 6,735,699 | B1 | 5/2004 | Sasaki et al. |
| 7,430,543 | B1 * | 9/2008 | Benkoski et al. ............... 705/59 |

OTHER PUBLICATIONS

Harrison, Ann: "ARIS says it's on key with digital watermark", MAss High Tech (Watertown, MA, US), V14N26P1-Cambridge, MA, U, New England.

"Add a Touch of Class to Printed Documents", Baltimore Morning Sun: Jun. 12, 1998.

* cited by examiner

US 7,925,532 B2

CAD TOOL INCENTIVES

RELATED APPLICATIONS

This application is a continuation of U.S. patent application Ser. No. 09/780,882, entitled "Method For Creating Incentives For A CAD Tool Vendor" filed Feb. 9, 2001.

FIELD OF INVENTION

The invention pertains to the field of creating incentives for the completion of the design of an integrated electronic circuit.

BACKGROUND

The design of integrated electronic circuits (chips) is a complex process. Modern chip design methodologies use sophisticated computer aided design (CAD) programs to shorten design cycle times and improve the quality of the result. Each generation of CAD tools has become more complex, increasing the level of tool knowledge required by the chip designer to achieve a suitable result. Also, CAD tools must be upgraded while in service to accommodate new requirements imposed by the changing semiconductor technology, design methodology, and expectations for designer productivity.

Typically, CAD tools are developed by companies and sold or rented to designers or design teams. Various pricing schemes have been used including: per-seat, per-CPU-MIPS, per-user, and others. Typically, all of these pricing schemes restrict the number of copies and usage of the software and are accompanied by a maintenance charge that is accrued on a per time-unit basis, i.e., quarterly or yearly. These schemes are advantageous to CAD companies because revenue levels are established when the tool is sold and are typically sustained through the life of the design project or design program.

The CAD company is motivated to provide good pre-sales support to get the order. However, from the designer's point of view, these pricing schemes and the associated business models fail to create a situation where the CAD company is motivated to make the designer successful.

A business model is needed that creates an incentive for the CAD company to have a designer succeed with his design program.

SUMMARY OF THE INVENTION

In one embodiment of the invention, a software vendor receives two payments, one for access to the technology, providing unlimited usage and copies of the software, and a second payment when the technology produces a useful result, creating the desired incentive. The invention creates a new business model which exploits the negligible replication cost of software and connects payment to the success of the customer. In this situation, a software vendor finds it advantageous to create tools that are easy to learn, easy to use, and with all the necessary functionality. The software vendor is more likely to quickly resolve any problem encountered by a customer in order to hasten the completion of the customer's program and hence receive the payment. By sharing the financial risk, the software vendor becomes a trusted partner in the customer's program and increases customer productivity. The software vendor becomes a key part of the supply chain and shares in the rewards of opening the customer's productivity bottleneck.

DETAILED DESCRIPTION OF THE PREFERRED EMBODIMENT

Figure 1:
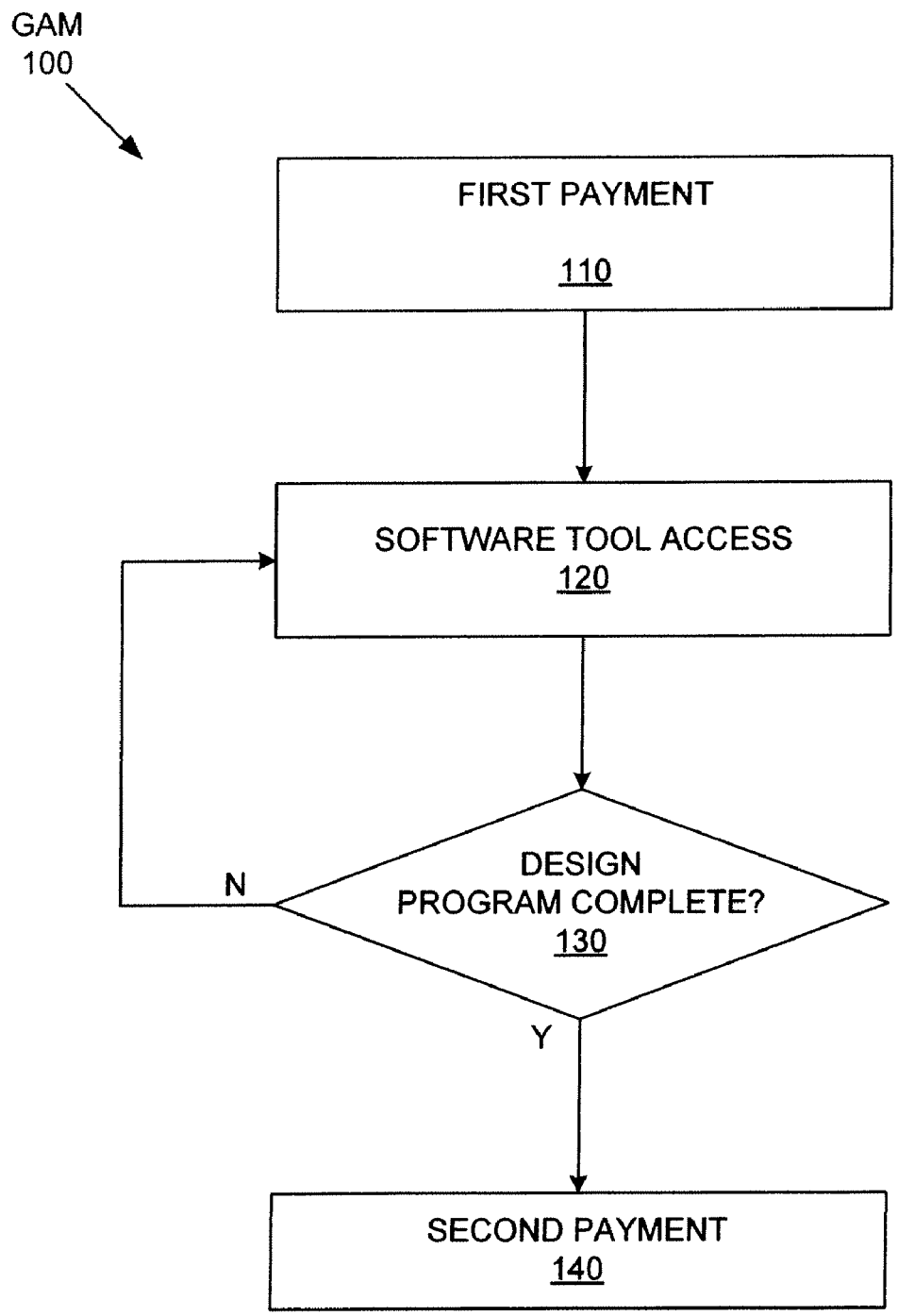
FIG. 1 shows a flow diagram of a pricing scheme that creates incentives for a software vendor.

A method for creating incentives for a software vendor is disclosed. In the following descriptions, numerous specific details are set forth, such as the specific rendering of the implementation, in order to provide a thorough understanding of the present invention. It will be apparent, however, to one skilled in the art that the present invention may be practiced without these specific details. In other instances, well-known techniques have not been shown in detail, in order to avoid unnecessarily obscuring the present invention.

The application of the invention to CAD tools for the design of integrated circuits will be used as an example. The Global Access Model (GAM) 100 shown in the figure is a pricing mechanism that meets the needs of the designer and the CAD tool vendor. Payment is broken into two parts. The first payment in step 110 is used to gain access in step 120 to the technology embodied in the CAD tools. The second payment is due in step 140 upon completion of the design program in step 130.

For each generation of semiconductor technology, a first payment is required which provides the designer with complete access to the CAD tools for that technology. The CAD tools may be used worldwide and the usage and number of copies is unlimited. Unlike typical licensing business models, there is no artificial limitation to the availability of the software, so the designer productivity is maximized. The first payment serves at least three purposes for the CAD tool vendor. First, the first payment allows the CAD tool vendor to recover some of the costs of developing the software for a particular semiconductor technology. Second, the first payment covers the initial costs of servicing an additional customer, including: training, setup, administration, and others. Third, the first payment serves to screen out potential customers that have limited resources or commitment to learning the CAD company's tools and thus are unlikely to complete an entire project.

The second payment creates a significant incentive for the CAD company to help the designer complete his project as rapidly and inexpensively as possible. Sharing the risks and rewards of each design project helps to make the CAD company a trusted partner and its engineers become part of the design team. Trust facilitates the sharing of information and the cooperation needed to efficiently solve problems. Problems with the CAD tools that slow down a designer can typically be divided into two categories: internal and external. Internal problems are associated with an individual CAD tool performing either incorrectly or in an unexpected fashion. The time to isolate the problem and correct it can be substantially reduced by a cooperative effort between the designer and the CAD company's engineers. External problems are associated with integrating one CAD tool with another. Most designers use a complex and inefficient set of scripts and translator programs to integrate CAD tools from multiple companies to create a design flow. Current payment schemes do not create an incentive for the CAD company to assist with this integration. However, under GAM there is an incentive for the CAD company to modify its tool to enable simple and efficient integration. Under GAM, the CAD company is rewarded for cooperating with the designer and improving its product by receiving the second payment sooner. Early completion of the design program and increased designer productivity also increases the likelihood of additional projects which result in additional second payments.

Defining criteria for establishing when the first payment is due is relatively simple. The first payment may be due upon receipt of the tools or after an evaluation period. Enforcement of the payment is simple since the CAD company need only arrange to deny continued usage of the tools by the designer. Any of the well-known techniques for regulating the usage of software may be used by the CAD company including: licensing, passwords, time limits, usage counts, and others.

Criteria establishing when the second payment is due depend on the nature of the design project itself. Some design projects are intended to be complete upon production of actual chips, whereas, other design projects may be deemed complete before this stage. Design projects intended to produce chips have several points at which they could be considered complete, triggering the liability of the second payment. Some of these points include: request for manufacturing of prototypes, receipt of manufactured prototypes, request for manufacturing of production units, receipt of production units, and others. Additional criteria may be established including requirements that prototype units operate to meet a predefined quality level, production chips have sufficient yield to specifications, and/or others.

Often, prototype chips are found to have design defects or need additional features. The designer must alter the design and repeat the step of manufacturing prototypes. This situation needs to be considered with respect to the triggering of liability for the second payment. Possible solutions include: no additional liability, partial additional liability or full additional liability. The selection among these choices could be governed by whether the product of the original design is used or by the extent to which changes are made to the original design. Possible criteria to judge the extent of design changes include: number of mask layers modified, number of files modified, running of certain portions of the CAD tools, and others.

Design projects that complete before making production chips create data that can be incorporated into other designs. These data have many different forms depending on intended usage and the degree to which the design has been completed. Some of the forms include: hardware description language (HDL), register transfer level description (RTL), macros, hard macros, soft macros, cores, hard cores, soft cores, netlist, synthesizable net-list, layout, process-independent layout, process-dependent layout, and others. Associated with each of these possible forms are additional data that can be used to verify the integrity of the data. The generation of data in any of the possible forms that satisfies the verification process can be used to trigger the liability of the second payment. Correction of design defects or adding features may be considered to incur no, partial or complete additional liability. Possible criteria to judge the extent of design change include: running of certain CAD tools, number of files modified, and others.

As described above, a number of well-known techniques exist to enforce the first payment by denying use of the CAD tools to the designer. A number of possible techniques are available to enforce the second payment, some automatic, others manual. Some automatic techniques would function by denying the designer the ability to complete his project. Possible automatic techniques include: inability to generate certain output files, inability to run certain CAD tools, and others. Other automatic techniques would use an automated payment scheme that would make payment to the software vendor as part of a transaction that produces a result. Possible manual techniques include: contract agreements, site audits, rebates, and others. The choice of technique may be based on the size of the payment, with automatic techniques providing for efficient collection of a large number of small payments while manual techniques may suffice for a small number of large payments.

A rebate is a payment made to the designer (or design team) by an entity upon receipt of design data from the designer, which in turn collects payment from the CAD company. Typically, the funds for the rebate were included in the first payment. This allows the CAD company to monitor usage by the designer.

Figure 2:
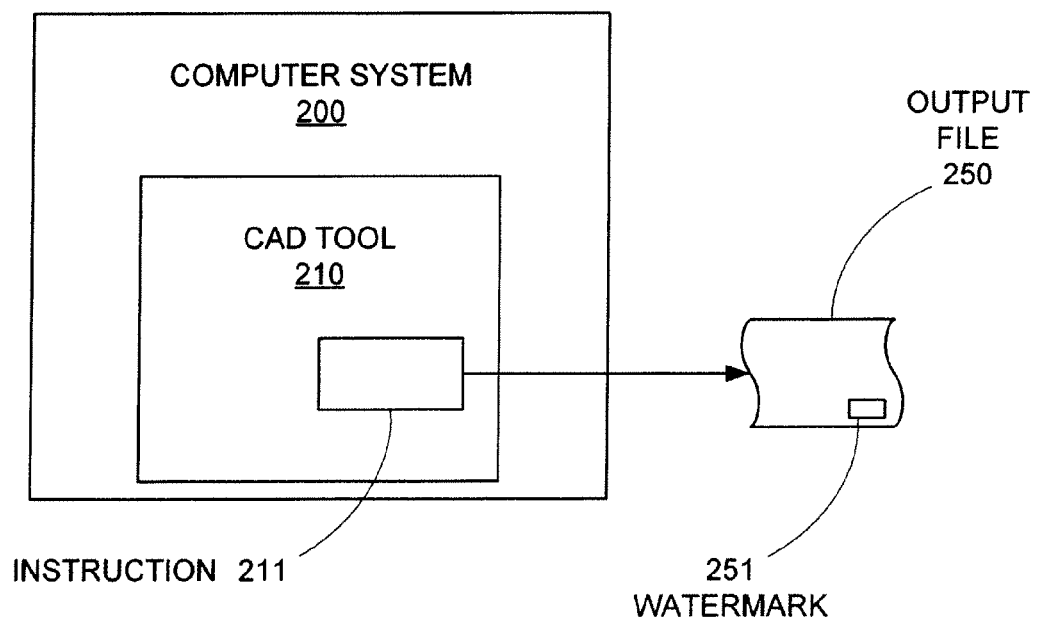
FIG. 2 shows a block diagram of a CAD tool that includes watermarking capabilities.

A site audit is a process whereby the CAD company or its agent audits the work product of the designer, looking for usage of the CAD tools. As shown in FIG. 2, a site audit could, for example, be aided by a CAD tool 210 that includes an instruction 210 for causing a computer system 200 to insert data 251 into an output file(s) 250 that identifies this file as having been produced by CAD tools from this particular CAD company; this is known as a watermark 251. The watermark 251 may consist of non-functional data (also known as comments) added to the output file that is ignored by programs processing this file as input. The watermark 251 may consist of a unique pattern within the actual data itself. Possible unique patterns include naming conventions (i.e., distinctive names generated by the tool), spacing conventions (i.e., a distinctive method of inserting white space), ordering conventions (i.e., a distinctive order of the information in the output file), adding non-functional elements, and others. Alternatively, the CAD tools could produce a log file of results produced for review in the site audit.

The invention can also be applied to other computer-based tools that produce an output or result that can be defined. The invention can be applied in a wide range of fields, including the design of mechanical devices, biological molecules, drugs, electronic and electromechanical systems, and publications. For example, a document creation system could trigger the second payment when a document is sent to the printer. The invention can also be applied to analysis tools, including signal processing, statistical analysis, financial analysis, data mining, and Internet search engines. In this case, the second payment could be triggered when the user creates a report or makes a decision, such as the purchase or sale of a stock or bond.

The size and relative size of the first and second payments can vary depending on the nature of the market, the market conditions and the needs of the software vendor to advantageously apply this invention. At the early stages of a market, the first payment might be large, to fund the development of the technology and a relatively small proportion of the revenue may come from the second payment(s). As the market matures, a software vendor that is attempting to enter the market may use a low, or even zero, first payment to achieve market penetration and rely more heavily or entirely on the second payment to achieve profitability. The size of the second payment can be set according to the value of the result to the particular customer program.

In the foregoing specification, the invention has been described with reference to a specific exemplary embodiment and alternative embodiments thereof. However, it will be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method of designing an integrated circuit, the method using a computer system running a computer-aided design (CAD) tool to generate one or more outputs, the method comprising:
making a first payment that provides user access to the CAD tool in accordance with a contract;
using the computer system, running the CAD tool to facilitate designing the integrated circuit, wherein the computer system automatically requests an additional payment in response to a predetermined CAD tool output; and
receiving a payment request for the additional payment when the computer system identifies the predetermined CAD tool output.

2. The method of claim 1, further comprising sending an additional payment to a vendor of the CAD tool in response to the payment request and in accordance with the contract.

3. The method of claim 1, wherein the CAD tool comprises an integrated circuit design tool.

4. The method of claim 1, wherein the predetermined CAD tool output has a form of at least one of hardware description language (HDL), register transfer level description (RTL), a macro, a hard macro, a soft macro, a core, a hard core, a soft core, a net-list, a synthesizable net-list, a layout, a process-independent layout, and a process-dependent layout.

5. A method of making an integrated circuit, the method using a computer system running a computer-aided design (CAD) tool to generate one or more outputs, the method comprising:
making a first payment that provides user access to the CAD tool in accordance with a contract;
using the computer system, running the CAD tool to facilitate designing the integrated circuit;
generating a predetermined CAD tool output by running the CAD tool; and
receiving a payment request for an additional payment in response to generating the predetermined CAD tool output and meeting predetermined post-design criteria associated with the integrated circuit,
wherein the predetermined post-design criteria include at least one of: a request for prototype manufacturing, a receipt of manufactured prototypes, a request for manufacturing of production units, a receipt of production units, operation of production units meeting a predefined quality level, and production units having at least a predefined yield.

6. The method of claim 5, further comprising sending an additional payment to a vendor of the CAD tool in response to the payment request and in accordance with the contract.

7. The method of claim 5, wherein the CAD tool comprises an integrated circuit design tool.

8. The method of claim 5, wherein the predetermined CAD tool output has a form of at least one of hardware description language (HDL), register transfer level description (RTL), a macro, a hard macro, a soft macro, a core, a hard core, a soft core, a net-list, a synthesizable net-list, a layout, a process-independent layout, and a process-dependent layout.

9. A method for contracting a use of a computer-aided design (CAD) tool for generating one or more outputs, the method comprising:
receiving a first payment for the CAD tool as a vendor of the CAD tool in accordance with a contract, wherein the first payment is associated with user access to the CAD tool;
configuring a computer system running the CAD tool to identify when the CAD tool generates a predetermined CAD tool output; and
generating a payment request for an additional payment when the computer system identifies the predetermined CAD tool output.

10. The method of claim 9, further comprising receiving another payment as the vendor of the CAD tool in response to the payment request and in accordance with the contract.

11. The method of claim 9, wherein the CAD tool comprises an integrated circuit design tool.

12. The method of claim 9, wherein the predetermined CAD tool output has a form of at least one of hardware description language (HDL), register transfer level description (RTL), a macro, a hard macro, a soft macro, a core, a hard core, a soft core, a net-list, a synthesizable net-list, a layout, a process-independent layout, and a process-dependent layout.

13. A method for contracting a use of a computer-aided design (CAD) tool for generating one or more outputs, the method comprising:
receiving a first payment for the CAD tool as a vendor of the CAD tool in accordance with a contract, wherein the first payment is associated with user access to the CAD tool;
configuring a computer system running the CAD tool to identify when the CAD tool generates a predetermined CAD tool output;
determining when predetermined post-design criteria associated with the integrated circuit are met; and
generating a payment request for an additional payment when the computer system identifies the predetermined CAD tool output and the predetermined post-design criteria are met,
wherein the predetermined post-design criteria include at least one of: a request for prototype manufacturing, a receipt of manufactured prototypes, a request for manufacturing of production units, a receipt of production units, operation of production units meeting a predefined quality level, and production units having at least a predefined yield.

14. The method of claim 13, further comprising receiving another payment as the vendor of the CAD tool in response to the payment request and in accordance with the contract.

15. The method of claim 13, wherein the CAD tool comprises an integrated circuit design tool.

16. The method of claim 13, wherein the predetermined CAD tool output has a form of at least one of hardware description language (HDL), register transfer level description (RTL), a macro, a hard macro, a soft macro, a core, a hard core, a soft core, a net-list, a synthesizable net-list, a layout, a process-independent layout, and a process-dependent layout.

* * * * *